United States Patent [19]

Ogawa

[11] Patent Number: 4,471,513
[45] Date of Patent: Sep. 18, 1984

[54] SEAT BELT BUCKLE MOUNTING DEVICE
[75] Inventor: Kiyoshi Ogawa, Seiwa-Ryo, Japan
[73] Assignee: NSK-Warner, K.K., Tokyo, Japan
[21] Appl. No.: 328,717
[22] Filed: Dec. 8, 1981
[30] Foreign Application Priority Data Dec. 27, 1980 [JP] Japan .......................... 55-191434[U]

[51] Int. Cl.³ ............................................ F16G 11/04
[52] U.S. Cl. ............................ 24/581; 24/115 R; 24/115 M
[58] Field of Search ............ 24/201 R, 201 A, 201 C, 24/211 R, 222, 115 R, 115 M, 136 R, 230 R; 423/265, 268, 277

[56] References Cited
U.S. PATENT DOCUMENTS

| 1,551,404 | 8/1925 | Kennison | 24/230 R |
| 2,403,057 | 7/1946 | Davis | 24/222 X |
| 3,289,259 | 12/1966 | Laharty | 24/115 R |
| 3,420,275 | 1/1969 | Glen et al. | 24/201 C |
| 4,018,902 | 4/1977 | Dee | 24/230 R X |
| 4,118,059 | 10/1978 | Lindsay | 24/115 R X |

FOREIGN PATENT DOCUMENTS 1408499 10/1975 United Kingdom .

Primary Examiner—William E. Lyddane
Assistant Examiner—Peter A. Aschenbrenner
Attorney, Agent, or Firm—Lane, Aitken & Kananen

[57] ABSTRACT

A seat belt buckle mounting device for use in motor vehicles and the like includes an attachment body that is secured to an anchoring cable and a buckle base plate to which the anchoring body is attached. The attachment body includes longitudinally extending grooves formed on opposite sides thereof and the buckle base plate includes a central aperture for receiving the attachment body and having inwardly extending opposed projections that are designed to enter and forcibly engage the grooved portions of the attachment body to thereby fixedly secure the attachment body to the buckle base plate. The present invention advantageously provides a seat belt buckle mounting device in which the piece parts are both simple to manufacture and assemble when compared to prior devices.

8 Claims, 11 Drawing Figures

SEAT BELT BUCKLE MOUNTING DEVICE

BACKGROUND OF THE INVENTION

The present invention relates to seat belt systems and, more particularly, to seat belt buckle mounting or connecting devices for use in motor vehicles or the like.

Seat belts provide very effective protection for the user by minimizing the probability of injury in vehicular collisions. The typical seat belt system, as shown in FIG. 1, includes a tongue 2 that is attached to the restraint webbing and which is engageable, for example, by manual insertion, with a buckle assembly 3 that is usually located in a position between the passengers, such as between the seats in the case of a vehicle with individual front seats. The buckles are usually anchored to the vehicle floor or other structural member through a flexible self-supporting wire 4, usually in the form of a woven wire cable. This typical system has the advantage that the tongue 2 and the seat belt webbing can be easily drawn across the passenger with one hand since the buckle assembly 3 is permanently located in the central position.

In the prior seat belt systems, the manufacture of the buckle base 3 and its attachment wire 4 has involved multiple parts and assembly operations. For example, in these prior structures, a flat surface is usually formed on a metal fitting that is then secured or otherwise attached to one end of the anchoring wire. A hole is usually formed in the flat surface of the metal fitting and also in the buckle base and a pin is usually used to effect a connection between the two. In this conventional manufacturing sequence, the manufacture of the metal fitting, its connection to the anchoring cable, and the pinned connection to the buckle base are comparitively involved and can be the source of difficulty in both the manufacturing of the various piece parts and in effecting the pinned connection between the various parts.

A seat belt securing device developed by the applicant that eliminates the drawbacks of the former design is shown in FIGS. 2 and 3 and includes a metal attachment body or fitting 16 and a comparitively plate-like base 17. The metal fitting 16 is secured to one end of an anchoring cable or wire 11 by suitable means, for example, by swaging the fitting 16 to the cable 11. The opposite lateral sides of the metal fitting have outwardly facing longitudinal grooves 12, 13 and 14, 15 (groove 15 is not shown in FIG. 2) formed thereon. The buckle base 17 is formed on a plate-like member and includes a central aperture or opening (unnumbered) with spaced apart projections 18 and 19 extending inwardly from opposite lateral sides of the opening. In order to engage the metal fitting 16 with its mating base 17, the metal fitting 16 is inserted into the opening in the base 17 in the manner indicated by the arrow in FIG. 2 (alternate dot and dashes) so that the grooves 12 and 13 and the projections 18 and the grooves 14 and 15 and the projections 19 are in line. Thereafter, the metal fitting 16 and the base 17 are moved relative one another so that the projections 18 slide into and are received in the grooves 12 and 13 and the projections 19 are likewise received in the grooves 14 and 15. In order to prevent the metal fitting 16 from unintentionally disengaging from the base 17, the distance between the tips of the opposed projections 18 and the distance between the tips of the opposed projections 19, as shown in FIG. 3, is made smaller than the thickness of the metal fitting 16 (phantom line illustration in FIG. 3) between the bottom of the respective grooves so that a force fit exists between the inwardly extending ends of the projections 18 and 19 and the bottom walls of the respective grooves 12, 13 and 14, 15. As can be appreciated by those skilled in the art, as the thickness dimension between the bottom of the grooves in the metal fitting 16 is increased, the force necessary to effectively couple the metal fitting 16 and the base 17 increases; it being possible that the base 17 can be deformed during the coupling operation since the metal fitting 16 engages the base 17 at the bottom of the longitudinal grooves 12, 13 14 and 15.

SUMMARY OF THE INVENTION

In view of the above, it is an object of the present invention, among others, to provide a seat belt buckle mounting or connecting device for use in motor vehicles or the like.

It is a further object of the present invention to provide a seat belt buckle mounting or connecting device that is simple to manufacture, which has less parts than prior designs, which is easy to assemble, and which is more reliable in operation.

It is a further object of the present invention to provide a seat belt buckle mounting or connecting device by which only a relatively modest insertion force or pressure is required for effecting coupling of the parts.

In accordance with the present invention, a seat belt buckle base securing or connecting device includes an attachment body having outwardly facing longitudinally grooves on opposite side surfaces thereof and a plate-like buckle base having a central opening for receiving the attachment body. Opposed inwardly extending projections are provided on opposite sides of the opening in the buckle base so as to engage the receiving grooves on the attachment body. The projections are configured to forcibly engage the surfaces that defines the grooves of the attachment body so that the attachment body and the buckle base can be quickly and reliably secured together with a moderate insertion force.

The seat belt buckle mounting device of the present invention advantageously provides a device in which the piece parts are amenable to simple one-step manufacturing operations and can be interconnected by the application of an insertion or connecting force without the need for a connection pin, as in the case of prior designs.

BRIEF DESCRIPTION OF THE DRAWINGS

The above description as well as further objects, features, and advantages of the present invention will be more fully understood by reference to the following description of presently preferred but nonetheless illustrative embodiments when taken in conjunction with the accompanying drawings wherein.

DESCRIPTION OF THE PREFERRED EMBODIMENT

Figure 4:
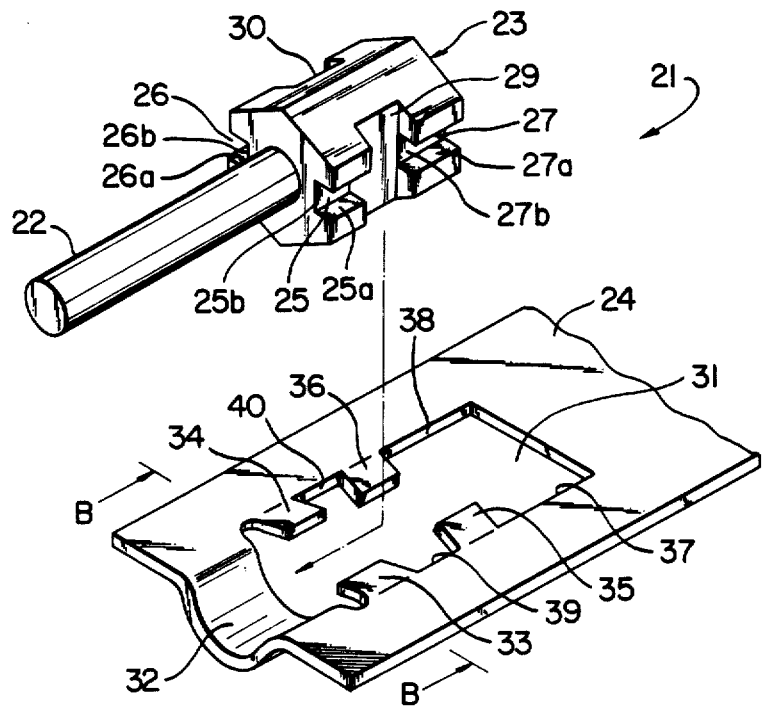
FIG. 4 is a perspective view of a seat belt buckle mounting device having an attachment body and complementary buckle base.
Figure 7:
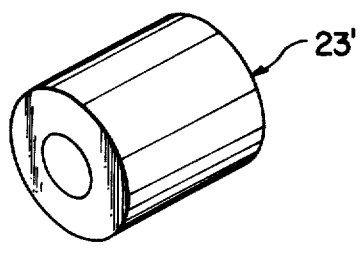
FIG. 7 is a perspective view of a cylindrical pre-form used in fabricating the attachment body.
Figure 5:
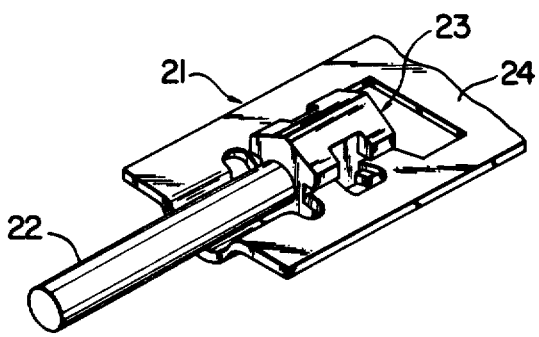
FIG. 5 is a perspective view of a seat belt buckle mounting device of FIG. 4 in which the attachment body and the buckle base are inter-engaged.
Figure 6:
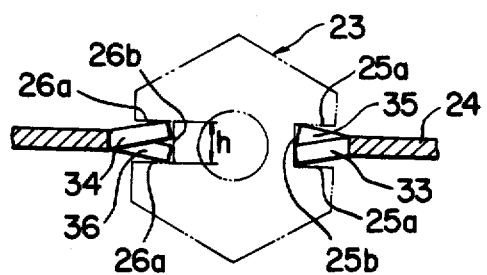
FIG. 6 is a cross sectional view of the attachment body (phantom line illustration) and the buckle base of FIG. 4 taken along line B—B of FIG. 4.

A seat belt buckle mounting or connecting device 21 is shown in FIGS. 4-6 and includes an attachment body in the form of a metal fitting 23 and a complementary plate-like buckle base 24. The metal fitting 23 is secured to a flexible anchoring cable or wire 22 and is preferably fabricated from a structural carbon steel (S15C) or free machining or free cutting steel having the pre-form cylindrical shape 23' as shown in FIG. 7. The wire 22 end is inserted into an appropriate sized bore in the cylinder pre-form 23' and the parts secured thereto by any number of known cable securing techniques. Preferably, the shaping of the metal fitting 23 is accomplished by a cold working or forming process in a suitable press so that the pre-form 23' is shaped or molded to its final form and the wire 22 is simultaneously secured thereto so that a structurally integrated unit is provided with a minimum of manufacturing steps. The opposite lateral sides of the metal fitting 23 are formed so as to include longitudinal grooves 25 and 27 on one side and longitudinal grooves 26 and 28 on the opposite side thereof (groove 28 is not visible in FIG. 4). The grooves 25 and 26 have respective bottom surfaces 25b and 26b and, likewise, the grooves 27 and 28 have respective bottom surfaces 27b and 28b. In addition, the grooves each have respective sidewall surfaces 25a, 26a, 27a, and 28a. A flat land or surface 29 is formed between the grooves 25 and 27 on the one side of the metal fitting 23 and another flat land or surface 30 is formed on the opposite side thereof between the grooves 26 and 28.

A buckle base 24 to which the metal fitting 23 is attached, as explained below, is formed as a plate-like member having a central aperture 31 defined by opposite sides edges 37 and 38 and a semi-circular portion 32 for accommodating and guiding the wire cable 22. The base 24 can be formed, for example, by a one-step stamping or pressing operation by which the final configuration of the base 24 is achieved in a single manufacturing step. Projections 33 and 35 are formed on the side edge of the opening 31 and are spaced apart from one another by edge portion 39. In a similar manner, projections 34 and 36 are formed on the other opposite side edge of the opening 31 and are spaced from one another by edge portion 40. The projections 33, 35, 34, and 36 are bent or inclined out of the plane of the base 24 as shown in FIG. 4 in directions perpendicular to the insertion direction of the metal fitting 23, that is, the projections 34 and 35 are inclined diagionally upward relative the plane of the base 24 in FIG. 4 whereas the projections 33 and 36 are inclined diagionally downward relative the plane of the base 24. As clearly shown in FIG. 6, the projections on each side of the opening 31 are inclined in opposite directions when viewed on end, that is, the projections 33 and 35 define an acute angle therebetween that is bisected by the plane of the base 24 and the projections 34 and 36 likewise define an acute angle therebetween bisected by the plane of the base 24. The projections 33 and 35 on the one side and the projections 34 and 36 on the other side are bent or inclined in opposite directions so that a height dimension (h) between the outwardly facing distal ends or tips of the projections 33 and 35 and the projections 34 and 36 is greater than the thickness of the base 24 and greater than the dimensional spacing between the respective sidewalls 25a, 26a, 27a, and 28a of the grooves 25, 26, 27, and 28. Additionally, the distance dimension between the ends of the projections 33 and 34 and the distance dimension between the projection ends of the projections 35 and 36 are set, respectively, somewhat smaller than the thickness dimension of the metal fitting 23 between the bottom surfaces 25b and 26b and the thickness dimension of the metal fitting between the bottom surfaces 27b and 28b of the various grooves.

In order to couple or mount the metal fitting 23 to the base 24 of FIG. 4, the metal fitting 23 is positioned adjacent the base 24 with the flat lands 29 and 30 of the metal fitting 23 aligned or in registration with the projections 35 and 36. The metal fitting 23 is then passed into the opening 31 so that the projections 33 and 34 are aligned with the grooves 25 and 26 and the projections 35 and 36 are aligned with the grooves 27 and 28. Thereafter, the metal fitting 23 and the base 24 are forcibly pulled relative to one another so that the projections 33 and 34 slide into and are received by the grooves 25 and 26 and the projections 35 and 36 slide into and are received by the grooves 27 and 28 with the inter-engaged metal fitting 23 and base 24 shown in FIG. 5. As shown in FIG. 6, the inclined distal ends of the projections 34 and 36 on the left in FIG. 6 and of the projections 33 and 35 on the right thereof engage the sidewalls of their respective grooves as well as engage the bottom surfaces of the respective grooves so that a force fit exists between the metal fitting 23 and the base 24 to securely fix the two parts together so that the metal fitting 23 cannot be unintentionally disengaged from the base 24. As can be appreciated, the metal fitting 23 can be fitted into the base 24 with a slight deformation of the projections 33, 34, 35, and 36 without requiring excessively large inserting forces.

Figure 8:
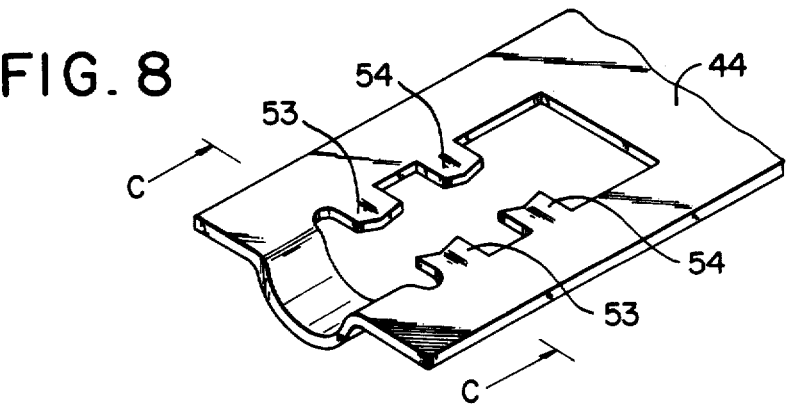
FIG. 8 is a perspective view of another embodiment of a buckle base plate.
Figure 9:
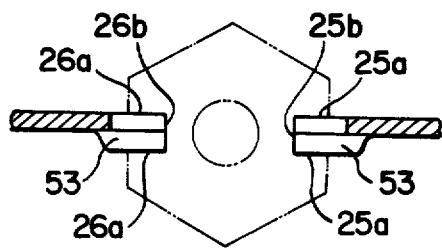
FIG. 9 is a cross sectional view of an attachment body (phantom line illustration) and the buckle base plate of FIG. 8 taken along line C—C of FIG. 8.

Another embodiment of the present invention is shown in FIG. 8 in which the shape of the projections is changed. In FIG. 8, a buckle base 44, similar to that shown in FIG. 4, is provided with chevron-like projections 53 and 54 in which a medial portion of each projection is depressed relative the edges thereof. As in the case of the base 24 shown in FIG. 4, the base 44 of FIG. 8 may be formed by a one-step stamping or pressing operation. The metal fitting 23 of FIG. 4 can be fitted into the base 44 of FIG. 8 in the same manner as the embodiment of FIG. 4; that is, the metal fitting 23 is positioned adjacent the base 44 with the projections 54 aligned with or in registration with the flat lands or portions 29 and 30 of the metal fitting 23. Thereafter, the metal fitting 23 is inserted into the opening and the parts are forcibly moved relative to one another so that the projections 53 slide into and are received by the grooves 25 and 26 and the projections 54 slide into and are received by the grooves 27 as shown in the sectional view of FIG. 9. As the projections 53 are received in the grooves 25 and 26 and the projections 54 are received in the grooves 27 and 28, the chevron-shaped projections "bite" into the confronting sidewall surfaces 25a, 26a, 27a, and 28a of the respective grooves 25, 26, 27, and 28. To assist in effecting this type of engagement, the hardness of the metal fitting 23 is made somewhat less than that of the base 44. The substantial "springback" of the engaged chevron-shaped projections assists in maintaining their engagement. Once the metal fitting 23 and the base 44 are so connected, the parts are thus securely fixed to one another and difficult to disengage.

Figure 10:
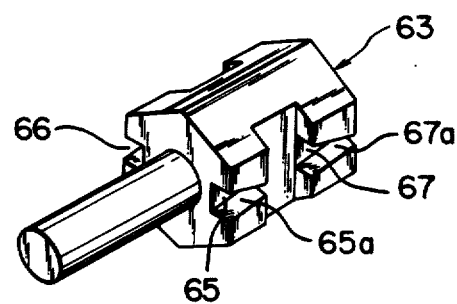
FIG. 10 is a perspective view of another embodiment of an attachment body.
Figure 11:
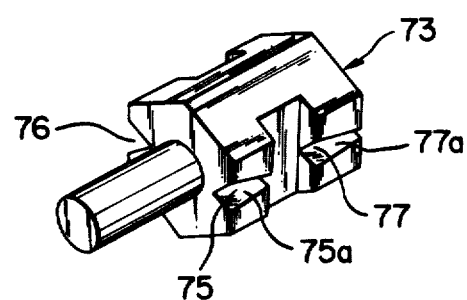
FIG. 11 is a perspective view of still another embodiment of an attachment body in accordance with the present invention.

Further embodiments of a metal fitting in accordance with the present invention are illustrated in FIGS. 10 and 11.

Figure 1:
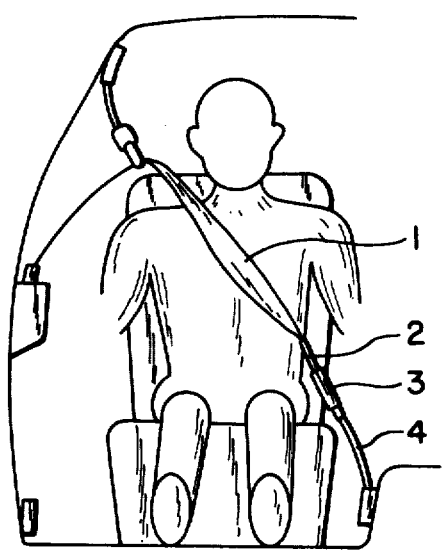
Fig. 1 is a front elevational view, in schematic form, of a motor vehicle passenger with a seat belt of known design.
Figure 2:
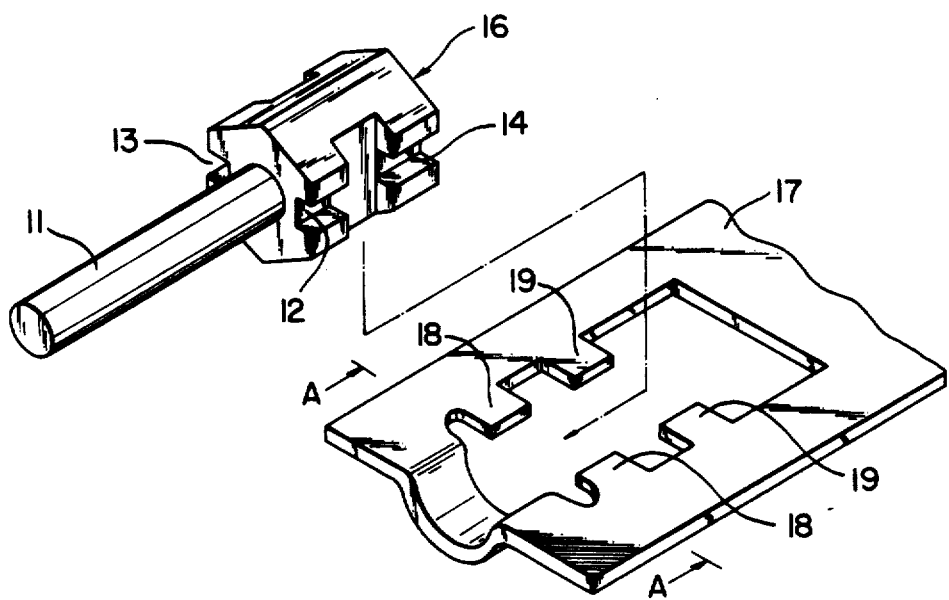
FIG. 2 is a perspective view of a seat belt connecting device that includes an attachment body and a complementary buckle base plate.
Figure 3:
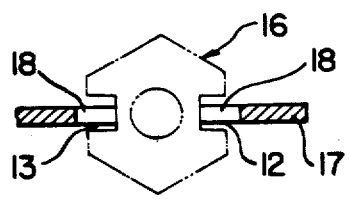
FIG. 3 is a cross sectional view of a connected attachment body and buckle base of the type illustrated in FIG. 2 with the attachment body shown in phantom line illustration taken along line A—A of FIG. 2.

In FIG. 10, the metal fitting 63 includes longitudinally extending grooves 65 and 67 on the one side and longitudinally extending grooves 66 and 68 on the other side thereof (groove 68 is not shown in FIG. 10). The sidewalls 65a, 66a, 67a, and 68a of the respective grooves 65...68 are tapered relative to one another so that they converge towards one another in the direction of the non-cable end of the metal fitting 63, so that the bottom surfaces of the respective grooves, when viewed from the side have a trapezoidal shape (not specifically shown in the figures). The metal fitting 63 of FIG. 10 may be coupled to any of the bases having the configurations shown in FIGS. 2, 4, and 8. For example, when using the base 17 shown in FIG. 2, when the metal fitting 63 is fitted to the base 17, substantial and very large surface pressure forces are developed between the projections 18 and 19 of the base 17 and both sides 65a, 66a, 67a, and 68a of the respective longitudinal grooves 65, 66, 67, and 68 by virtue of the wedging effect between the converging sidewalls and the projections, so that it is very difficult for the metal fitting 63 to be dis-engaged from the base 17. As can be appreciated, the grooves 65...68 can include a sidewall portion in which the spacing is uniform as well as a portion in the spacing converges.

In FIG. 11, the metal fitting 73 includes longitudinal grooves 75 and 77 on the one side and longitudinal grooves 76 and 78 on the opposite side thereof (groove 78 is not shown in FIG. 11). The sidewalls 75a, 76a, 77a, and 78a, of the respective grooves 75, 76, 77, and 78 are tapered relative one another so that they converge towards one another in the direction of the non-cable end of the metal fitting 73 and are also tapered relative one another so they converge together in the direction of the longitudinal axis of the metal fitting 73 so that the grooves, when viewed in cross section have a V-shape (not specifically shown). Accordingly, in the embodiment 73 of FIG. 11, the dimensional spacing between the respective sides 75a, 76a, 77a, and 78a, becomes greater in the direction of the attachment cable and smaller in the direction opposite the attachment cable. The metal fitting 73 is suitable for use with any of the buckle base plates of FIGS. 2, 4, and 8. Where the metal fitting 73 is mounted to the base 17 shown in FIG. 2, the insertion pressure or force is reduced to a fairly large extent because of a linear contact at the beginning of the insertion step, but after insertion, the metal fitting 73 becomes exceedingly difficult to disengage from the base 17 by virtue of the wedge effect derived from the V-shaped grooves. Although the longitudinal grooves shown in the embodiment of FIG. 11 have a V-shaped section, as can be appreciated by one skilled in the art, they also may have a U-shaped section.

As will be apparent from the above, the mounting device of the present invention is constructed so that the various surfaces that define the longitudinal grooves formed in the metal fitting effectively cooperate with the projections formed in the buckle base so that the metal fitting can be easily fitted into the base and, once they are fitted together, the base and the metal fitting are firmly fixed to each other. Additionally, the respective piece parts, that is, the metal fitting that the buckle base are susceptible to one-step fabrication techniques to provide a seat belt buckle mounting device that is both simple to fabricate and use.

As can be appreciated by those skilled in the art, various other variations and changes may be made to the disclosed embodiments of the present invention without departing from the spirit and scope of the present invention as claimed in the appended claims and their legal equivalent.

What is claimed is:

1. A seat belt buckle mounting device comprising:
   a buckle base having an opening formed therein and opposed projections extending into said opening from a part of the opening;
   an attachement body having longitudinal grooves formed on opposite sides thereof, said grooves each having a first wall adapted to face an upper surface of one of the projections and a second wall adapted to face a lower surface of one of the the projections, a connecting member connected to said attachment body; said projections being shaped relative to said grooves so that said projections are forcibly received between the first walls and the second walls of the grooves of said attachment body to secure said attachment body and said buckle base together.

2. The seat belt buckle mounting device claimed in claim 1 wherein:
   said first and second walls of each groove are parallel at a predetermined spacings, and said projections are formed so as to have a greater thickness than the spacing between the walls.

3. The seat belt buckle mounting device claimed in claim 1 wherein:
   said projections on each side of said buckle base are inclined relative to one another at a predetermined angle whereby the outward distal ends of the projections engage the surfaces of the first walls and second walls.

4. The seat belt buckle mounting device claimed in claim 1 wherein:
   the projections on each side of said buckle base have chevron-shaped inwardly extending ends, whereby apexes of the ends engage the surfaces of the first walls and second walls.

5. The seat belt buckle mounting device claimed in claim 1 wherein:
   the width of the spacing between the first walls and second walls varies with respect to the longitudinal direction of the grooves.

6. The seat belt buckle mounting device claimed in claim 5 wherein:

the attachment body is adapted slidable received in said buckle base and wherein the width of the spacing between the first walls and second walls gradually increases with respect to the sliding direction of the attachment body when said attachment body is slidably received in said buckle base.

7. The seat belt buckle mounting device claimed in claim 1 wherein:
   said first and second walls are constructed be V-shaped when viewed in cross section.

8. The sheet buckle mounting device claimed in claim 1, wherein:
   said buckle base is the form of a plate and said opening is defined through said plate.

* * * * *